(12) United States Patent
Christensen et al.

(10) Patent No.: US 11,456,481 B2
(45) Date of Patent: Sep. 27, 2022

(54) CERAMIC-POLYMER COMPOSITE SINGLE ION CONDUCTING THIN FILM ELECTROLYTE

(71) Applicant: Robert Bosch GmbH, Stuttgart (DE)

(72) Inventors: John F. Christensen, Elk Grove, CA (US); Natasha Teran, Foster City, CA (US); Sondra Hellstrom, East Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 16/645,366

(22) PCT Filed: Oct. 4, 2018

(86) PCT No.: PCT/EP2018/077034
§ 371 (c)(1),
(2) Date: Mar. 6, 2020

(87) PCT Pub. No.: WO2019/072684
PCT Pub. Date: Apr. 18, 2019

(65) Prior Publication Data
US 2021/0119244 A1 Apr. 22, 2021

Related U.S. Application Data

(60) Provisional application No. 62/571,348, filed on Oct. 12, 2017.

(51) Int. Cl.
*H01M 10/056* (2010.01)
*H01M 4/38* (2006.01)
(Continued)

(52) U.S. Cl.
CPC ......... *H01M 10/056* (2013.01); *H01M 4/382* (2013.01); *H01M 10/0525* (2013.01);
(Continued)

(58) Field of Classification Search
CPC .................................................. H01M 10/056
See application file for complete search history.

(56) References Cited

U.S. PATENT DOCUMENTS

| 2014/0065513 A1 | 3/2014 | Badding et al. |
| 2015/0171430 A1 | 6/2015 | Engel et al. |

(Continued)

OTHER PUBLICATIONS

Askar et. al; "Polystyrene-Grafted Silica Nanoparticles: Investigating the Molecular Weight Dependence of Glass Transition and Fragility Behavior"; Published Feb. 25, 2017 (Year: 2017).*

(Continued)

*Primary Examiner* — Nathanael T Zemui
(74) *Attorney, Agent, or Firm* — Maginot, Moore & Beck LLP (57) ABSTRACT

A high transference number, thin-film electrolyte structure suitable for a battery includes a non-conducting organic phase portion and plurality of ion-conducting inorganic phase structures. The inorganic phase structures are dispersed throughout the organic phase portion and arranged generally in a layer. The inorganic phase structures are configured to span a thickness of the organic phase portion such that a respective portion of each structure is exposed on opposite sides of the organic phase portion. Respective interfaces between the organic phase portion and the inorganic phase structures possess strong adhesion characteristics via an unbroken chain of ionic bonds and/or covalent bonds. The interfaces in some embodiments include at least one adhesion promoter configured to promote adhesion between the organic phase portion and the inorganic phase structures. The inorganic phase structures in some embodiments have surfaces that are modified using a surface modification agent to promote adhesion to the organic phase portion.

13 Claims, 5 Drawing Sheets

(51) Int. Cl.
    *H01M 10/0525*    (2010.01)
    *H01M 4/02*       (2006.01)
(52) U.S. Cl.
    CPC ............... *H01M 2004/027* (2013.01); *H01M 2300/0071* (2013.01); *H01M 2300/0082* (2013.01); *H01M 2300/0091* (2013.01)

(56) References Cited

U.S. PATENT DOCUMENTS

| | | | |
|---|---|---|---|
| 2016/0028114 A1* | 1/2016 | Pratt | H01M 4/62 429/309 |
| 2016/0254560 A1 | 9/2016 | Aetukuri et al. | |
| 2017/0012319 A1 | 1/2017 | Anandan et al. | |
| 2019/0088998 A1* | 3/2019 | Schuhmacher | H01M 50/409 |

OTHER PUBLICATIONS

International Search Report corresponding to PCT Application No. PCT/EP2018/077034, dated Nov. 30, 2018 (3 pages).

Aetukuri, Nagaphani B. et al., "Flexible Ion-Conducting Composite Membranes for Lithium Batteries," Advanced Energy Materials, vol. 5, Issue 14, May 12, 2015 (6 pages).

Ruiterkamp, G.J. et al., "Surface functionalization of titanium dioxide nanoparticles with alkanephosphonic acids for transparent nanocomposites," Journal of Nanoparticle Research, 13, 2779-2790, Dec. 14, 2010 (12 pages).

* cited by examiner

CERAMIC-POLYMER COMPOSITE SINGLE ION CONDUCTING THIN FILM ELECTROLYTE

This application is a 35 U.S.C. § 371 National Stage Application of PCT/EP2018/077034, filed on Oct. 4, 2018, which claims the benefit of U.S. Provisional Application 62/571,348, filed Oct. 12, 2017, the disclosures of which are incorporated herein by reference in their entirety.

FIELD

The disclosure relates to batteries and more particularly to a high transference number composite thin-film electrolyte for use in batteries.

BACKGROUND

Batteries are a useful source of stored energy that can be incorporated into a number of systems. Rechargeable lithium-ion ("Li-ion") batteries or cells are attractive energy storage systems for portable electronics and electric and hybrid-electric vehicles because of their high specific energy (measured in Wh/kg) compared to other electrochemical energy storage devices. However, current Li-ion cells are reaching their maximum energy storage capability (approximately 250 Wh/kg). With this limitation, these cells are unable to provide a safe, low-cost battery with storage sufficient for electric vehicles with mile ranges in excess of 100 miles. In order achieve longer ranges, a new generation of cells with higher energy densities (at least 400 Wh/kg), low cost (less than \$125/kWh), improved safety, and low environmental impact is needed. One option includes use of cells with a form of lithium metal ("Li-metal") incorporated into the negative electrode. These cells afford exceptionally high specific energy and energy density compared to batteries with conventional carbonaceous negative electrodes.

As an example, when high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of approximately 280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ and $FeF_3$ are also available. The foregoing materials, however, react with lithium at a lower voltage compared to conventional oxide positive electrodes, thereby limiting the theoretical specific energy. The theoretical specific energies of the foregoing materials, however, are very high (greater than 800 Wh/kg, compared to a maximum of approximately 500 Wh/kg for a cell with lithium negative and conventional oxide positive electrodes).

Thus the advantage of using a Li-metal negative electrode (sometimes referred to as an anode) is the much higher energy density of the entire cell, as compared to cells with graphitic or other intercalation negative electrode. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures. One factor inhibiting the commercialization of Li-metal based cells is the lack of a suitable thin film electrolyte that inhibits the formation of these high surface area structures as well as providing other beneficial functions for the cell.

Existing candidate solid electrolytes have insufficient conductivities, low transference numbers, and poor mechanical properties (e.g., polymers), poor processability and high boundary resistances (e.g., ceramics), or severe chemical instabilities to air and water (e.g., sulfidic materials). Many research groups are seeking ways to combine candidate materials, such as polymers and ceramics, to achieve a single composite material with the best of all available properties. The vast majority of this work has been performed on polymer-ceramic composites in which both the polymeric and ceramic phases of the composite are ionically conductive. However, such composites suffer from some problems that limit their utility. In particular, polymer-ceramic composites cannot be sintered due to the organic phase, and conductivity across grains in unsintered ceramics is typically extremely poor. Additionally, interfacial conductivity between the polymeric and ceramic phases is typically very poor. Li-ion conductivity pathways tend to be exclusively through the polymer, but the polymeric phase is not sufficiently mechanically strong so as to resist dendrite penetration.

What is needed, therefore, is a thin (less than 20 micron), flexible, strong, dendrite resistant, and inexpensive single-ion-conducting membrane separator with sufficiently high ionic conductivity (greater than 1E-5 S/cm). Aside from enabling Li-metal batteries, such separators have exceptional utility in batteries more broadly. These separators may be used with other chemistries. If the transference numbers are high, and if the membranes are able to adequately block battery solvents and salts, these separators may additionally be used to separate anolyte from catholyte in an otherwise traditional battery, enabling, for example, use of higher voltage cathodes, or chemistries in which a single stable liquid electrolyte is not yet available. These separators may also be used to modulate salt concentration gradients in liquid, gel, or polymeric batteries, thereby enabling improved rate capability and faster charging/discharging. The membrane separators disclosed herein are configured to address any one of these, or related, problems.

SUMMARY

A battery cell in one embodiment includes a positive electrode, a negative electrode, and at least one thin-film composite electrolyte structure disposed between the positive electrode and the negative electrode, the electrolyte structure including a first side and a second side defining a thickness, a non-conducting organic phase portion extending from the first side to the second side, and a plurality of ion-conducting inorganic phase structures dispersed throughout the non-conducting organic phase portion, each of the plurality of ion-conducting inorganic phase structures spanning the thickness such that a first portion of each of the plurality of ion-conducting inorganic phase structures is exposed on the first side and a second portion of each of the plurality of ion-conducting inorganic phase structures is exposed on the second side, each of the plurality of ion-conducting inorganic phase structures defining a respective interface with the non-conducting organic phase portion, each of the respective interfaces includes an unbroken chain of at least one of ionic bonds and covalent bonds.

A composite electrolyte structure in one embodiment includes a first side and a second side defining a thickness, a non-conducting organic phase portion extending from the first side to the second side, and a plurality of ion-conducting inorganic phase structures dispersed throughout the non-conducting organic phase portion, each of the plurality of ion-conducting inorganic phase structures spanning the thickness such that a first portion of each of the plurality of ion-conducting inorganic phase structures is exposed on the first side and a second portion of each of the plurality of ion-conducting inorganic phase structures is exposed on the second side, each of the plurality of ion-conducting inorganic phase structures defining a respective interface with the non-conducting organic phase portion, each of the respective interfaces includes an unbroken chain of at least one of ionic bonds and covalent bonds.

A method for forming a thin-film, composite electrolyte structure in one embodiment includes preparing a plurality of particles from an ion-conducting inorganic phase, the particles having an average particle size that is one size of a range of sizes from 6 to 20 microns, improving an adhesion characteristic of the particles by at least one of applying an adhesion promoter to surfaces of the particles and using at least one surface modification agent to modify the surfaces of the particles, and encapsulating the particles with an organic phase formed as a continuous thin-film layer with a first side and a second side facing opposite the first side, each particle having a first surface portion exposed on the first side and a second surface portion exposed on the second side.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 1:
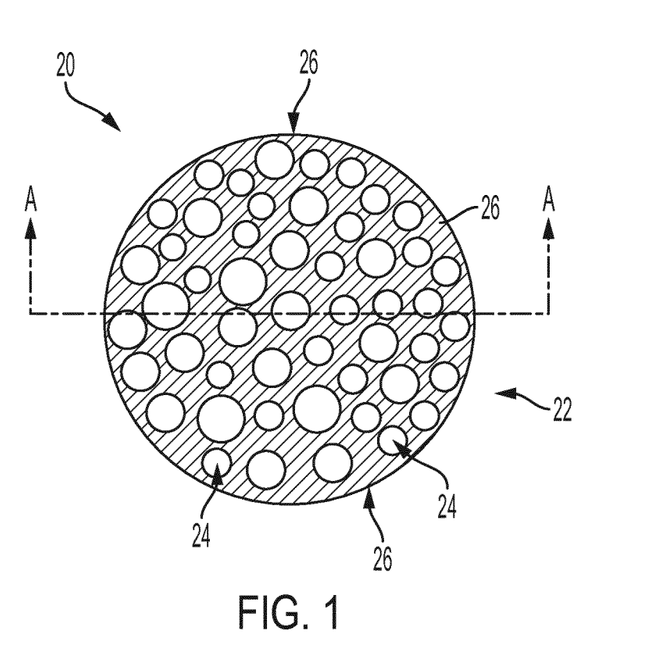
FIG. 1 shows a composite electrolyte structure in accordance with one embodiment.
Figure 2:
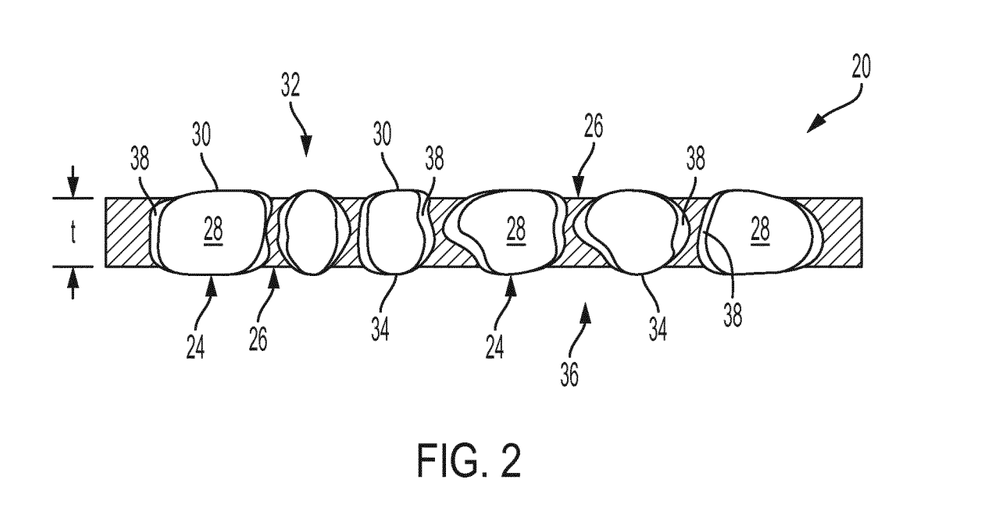
FIG. 2 is a section cut of the composite electrolyte structure of FIG. 1 taken through line A-A, illustrating the strong adhesion between an inorganic phase in the form of particles or structures and an organic phase.

FIGS. 1 and 2 depict a ceramic-polymer composite electrolyte 20 in the form of a thin, disk-shaped separator or membrane 22 in accordance with one embodiment. The composite electrolyte 20 includes at least one ion-conducting inorganic phase 24 (hereinafter the "primary inorganic phase") and at least one non-conducting organic phase 26 (hereinafter the "primary organic phase"). The primary organic phase 26 is a carbon-containing phase and is not an ionic conductor. This non-conducting attribute enables the primary organic phase 26 to direct the majority of the ionic current that traverses the composite electrolyte 20 through the primary inorganic phase 24. The composite electrolyte 20 in some embodiments includes one or more additional non-conducting inorganic phases (not shown) on one or more surfaces of the primary inorganic phase 24.

The primary inorganic phase 24 in the embodiment shown is composed of particles or structures 28 that traverse the entire thickness (t) of the membrane 22. The particles or structures 28 in some embodiments are amorphous, such as in a Li-ion conducting glass. In other embodiments, the particles or structures 28 are single-crystal particles with few or no grain boundaries per particle such that that the thickness (t) of the composite electrolyte 22 is the same order as the grain size in the primary inorganic phase 24. The particles or structures 28 in yet further embodiments are grown or sintered superstructures, such as nanowires or polycrystalline particles. The arrangement of the particles 28 in the composite electrolyte 20 ensures that substantially every particle 28 has a first exposed surface portion 30 on a first side 32 of the electrolyte 20 and a second exposed surface portion 34 on a second side 36 of the electrolyte 20. The first exposed surface portions 30 and the second exposed surface portions 34 of the particles 28 are generally opposed to another on the opposite sides 32, 36 of the electrolyte 20.

As best shown in FIG. 2, the primary organic phase 26 contacts the particles 28 of the primary inorganic phase 24 along respective interfaces 38 throughout the membrane 22. Since the primary inorganic phase 24 traverses the entire thickness (t) of the composite electrolyte 20, the ionic current traverses very few inorganic-organic interfaces and sintering of the composite material after assembly is substantially minimized if not eliminated entirely. This feature of the composite electrolyte 20 minimizes the effect of interfacial resistance between media. Additionally, modifications can further improve the interfacial resistance between the composite electrolyte 20 and other parts of a battery cell that incorporates the composite electrolyte, such as other electrolytes, cathode or anode materials, and the like.

The interfaces 38 between the primary inorganic phase 24 and the primary organic phase 26 are engineered to possess strong adhesion characteristics. In some embodiments, an unbroken chain of ionic bonds and/or covalent bonds is formed at the interfaces to promote strong adhesion therebetween. As used herein, an "unbroken chain" of one or more of ionic bonds and covalent bonds means that the number of actual bonds along the interface between the inorganic phase and the organic phase corresponds substantially with the number of possible bonds at the interface. In other words, the interface is configured to maximize the ionic and/or covalent bonds between the inorganic and organic phases at the respective interfaces such that there are virtually no discontinuities in bonding along the interfaces. In other embodiments, one or more of adhesion promotors and other surface modification agents are used to promote strong adhesion between the primary inorganic phase 24 and the primary organic phase 26. In the resulting composite electrolyte 20 depicted in FIGS. 1 and 2, the primary inorganic phase 24 confers ionic conductivity on the membrane 22 and the primary organic phase 26 confers mechanical cohesion and flexibility on the membrane 22.

The interfaces 38 between the primary inorganic phase 24 and the primary organic phase 26 are configured with a variety of features that promote the strong bonding between the primary phases 24, 26. In some embodiments, the particles 28 of the primary inorganic phase 24 are functionalized and then subjected to a blending process in order to promote strong bonding with the primary organic phase 26 (e.g., process 500 described with reference to FIG. 5). In other embodiments, the particles 28 of the primary inorganic phase 24 are subjected to a deposition process, an annealing process, a coating process, and a grouping/arranging process, and then subjected to another coating process in order to promote strong bonding with the primary organic phase 26 (e.g., process 600 described with reference to FIG. 6). In yet other embodiments, the particles 28 of the primary inorganic phase 24 are subjected to a deposition process and a reaction process or a grafting process, and then subjected to a blending process in order to promote strong bonding with the primary organic phase 26 (e.g., process 700 described with reference to FIG. 7). In still further embodiments, the particles 28 of the primary inorganic phase 24 are subjected to a coating process and a grafting process, and then a blade-casting process in order to promote strong bonding with the primary organic phase 26 (e.g., process 800 described with reference to FIG. 8).

Figure 3:
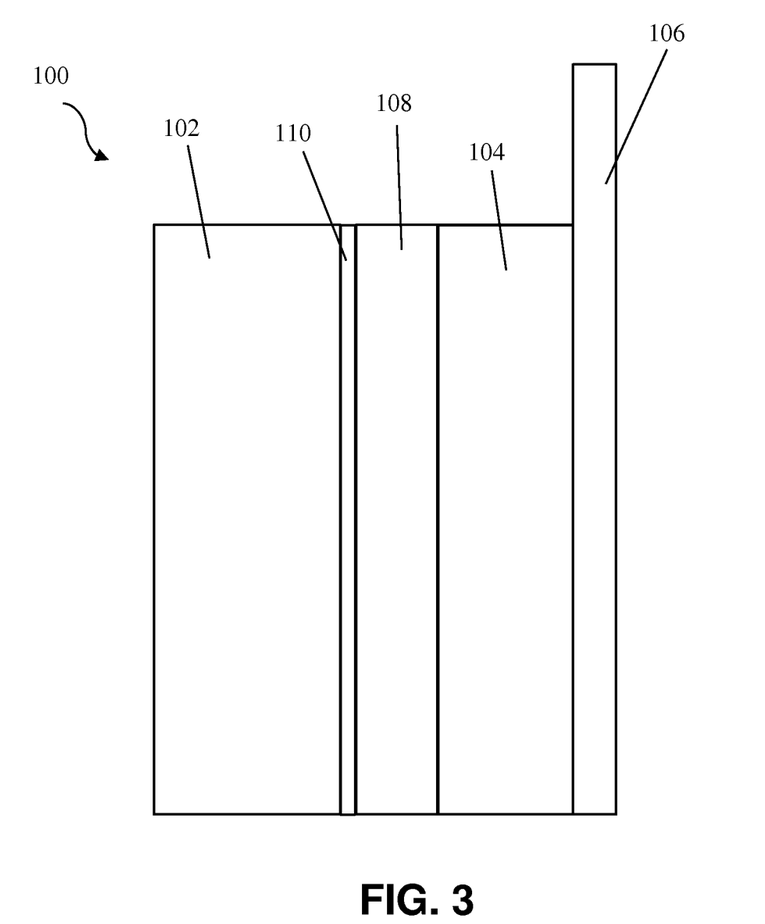
FIG. 3 depicts a simplified schematic of an electrochemical cell including the composite electrolyte structure of FIG. 1 in a first arrangement.

FIG. 3 depicts an electrochemical cell 100. The electrochemical cell 100 includes an anode 102, a cathode 104 with an aluminum ("Al") current collector 106, a separator 108, and a composite electrolyte structure 110. The anode 102 in the embodiment shown includes lithium metal, a lithium alloy metal, or a mesh filled with lithium metal or lithium alloy metal. The anode 102 is sized such that it has at least as much capacity as the cathode 104, and preferably at least 10% excess capacity. The Al current collector 106 is typically less than 30 microns in width and preferably less than 15 microns. In some embodiments, the Al current collector 106 has a surface treatment.

The cathode 104 includes a mixture of at least an active material and a matrix configured to conduct the primary ions of relevance to the cell 100. The active material in various embodiments includes a sulfur or sulfur-containing material (e.g., PAN-S composite or $Li_2S$); an air electrode; Li-insertion materials such as NCM, $LiNi_{0.5}Mn_{1.5}O_4$, Li-rich layered oxides, $LiCoO_2$, $LiFePO_4$, $LiMn_2O_4$; Li-rich NCM, NCA, and other Li intercalation materials, or blends thereof; or any other active material or blend of materials that react with and/or insert Li cations and/or electrolyte anions.

The matrix in various embodiments includes Li-conducting liquid, gel, polymer, or other solid electrolyte. Solid electrolyte materials in the cathode 104 may further include lithium conducting garnets, lithium conducting sulfides (e.g., $Li_2S$—$P_2S_5$) or phosphates, $Li_3P$, UPON, Li-conducting polymer (e.g., polyethylene oxide (PEO) or polycaprolactone (PCL)), Li-conducting metal-organic frameworks, $Li_3N$, $Li_3P$, thio-LISiCONs, Li-conducting NaSICONs, $L_{10}GeP_2S_{12}$, lithium polysulfidophosphates, or other solid Li-conducting material. Other materials in the cathode 104 may include electronically conductive additives such as carbon black, binder material, metal salts, plasticizers, fillers such as $SiO_2$, or the like. The cathode materials are selected to allow sufficient electrolyte-cathode interfacial area for a desired design. The cathode 104 may be greater than 1 micron in thickness, preferably greater than 10 microns, and more preferably greater than 40 microns. In one embodiment, the composition of the cathode 104 includes approximately 60 to 85 weight percent active material, approximately 3 to 10 weight percent carbon additive, and 15 to 35 weight percent catholyte.

Figure 4:
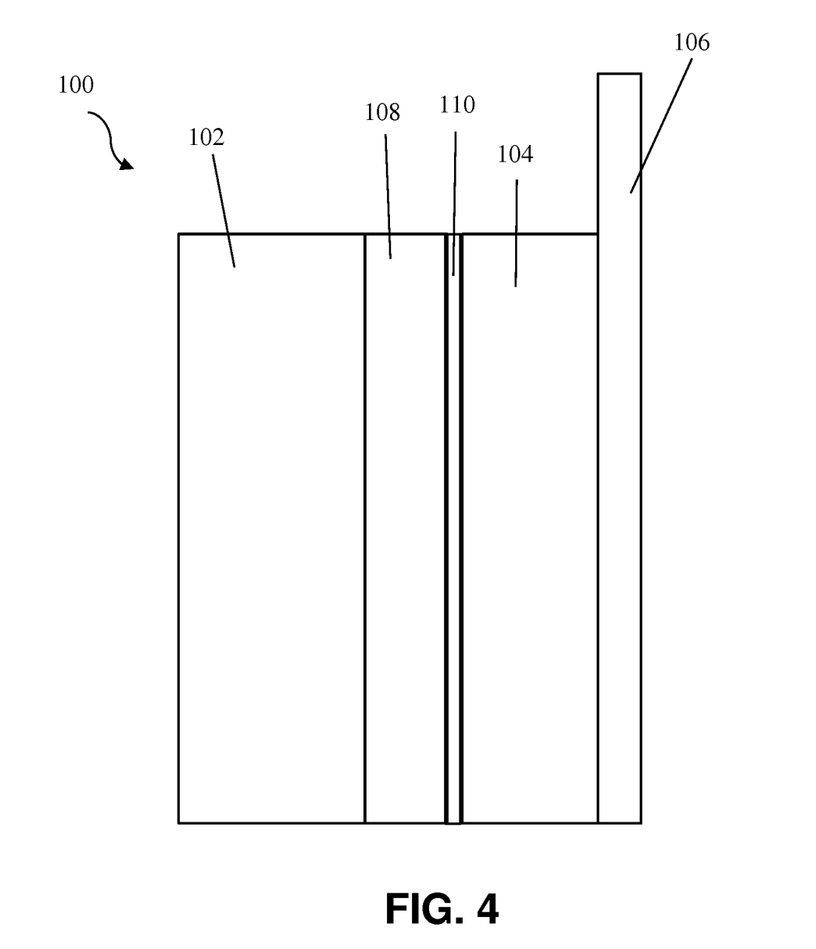
FIG. 4. depicts a simplified schematic of an electrochemical cell including the composite electrolyte structure of FIG. 1 in a second arrangement.

Although the cell 100 in the embodiment of FIG. 3 is shown with one separator 108 and one composite electrolyte structure 110, the cell 100 in different embodiments can omit the separator 108 or include more than one composite electrolyte structure 110. The composite electrolyte structure 110 can have different positions relative to the anode 102 and the cathode 104 in different embodiments of the cell 100. For example, FIG. 3 depicts the cell 100 with the composite electrolyte structure 110 positioned between the separator 108 and the anode 102. FIG. 4 depicts another embodiment of the cell 100 in which the composite electrolyte structure 110 is positioned between the separator 108 and the cathode 104. In yet another embodiment (not shown), a first composite electrolyte structure 110 is positioned between the separator 108 and the anode 102 and a second composite electrolyte structure 110 is positioned between the separator 108 and the cathode 104.

The anode 102 in some embodiments additionally or alternatively includes a composite electrode with a mixture of active material (e.g. Li, $Li_4Ti_5O_{12}$, Si or intermetallic compounds), an ionically conductive matrix (e.g., solid polymer electrolyte, liquid electrolytes, ceramic electrolytes (e.g., nano wires), solid polyelectrolytes, or combinations thereof), and electronically conductive additives (e.g., carbon black). The anode 102 in these embodiments can also include an anode current collector (e.g. Cu-foil with or without surface treatment).

The anode 102 in further embodiments additionally or alternatively includes a matrix that conducts the primary ions of relevance to the cell 100. This matrix could include liquid or gel electrolytes, polymeric electrolytes such as polyethylene oxide (PEO), or ceramic or glassy sulfidic or oxidic ion conductors, or combinations. The matrix could further include binder(s), metal salts, plasticizers, fillers such as $SiO_2$, or the like. The matrix may also contain carbon configured to provide electrical conductivity. The materials in the matrix on the anode side need not be identical to the material in the cathode side.

The anode 102 in still further embodiments additionally or alternatively includes a graphitic Li-ion battery anode with or without modifications. The anode 102 in yet still further embodiments additionally or alternatively includes Na or Mg metal or suitable intercalation compounds for Na or Mg metal ions.

The composite electrolyte structure 110 in various embodiments comprises the composite electrolyte 20 of FIG. 1 and any variants thereof formed by the processes 500, 600, 700, and 800 described herein with reference to FIGS. 5-8, a ceramic thin layer prepared as by sputtering (e.g. LiPON), a "free standing" ceramic or glass ceramic layer (e.g. LATP), a polymer-ceramic composite in which the organic phase also conducts ions, and a polymer or gel including PS-block-PEO. The requirements of the composite electrolyte structure 110 depend in part on whether the composite electrolyte structure 110 contacts the anode 102 or the cathode 104 in a cell. In embodiments in which the composite electrolyte structure 110 directly contacts a Li anode (FIG. 3), the composite electrolyte structure 110 must be stable against, or form a stable solid electrolyte interphase (SEI) against, Li metal. The composite electrolyte structure 110 must also function to suppress lithium dendrites or be resistant to Li dendrite penetration at current densities of at least 0.1 mA/cm2 when the composite electrolyte structure 110 directly contacts a Li anode.

Figure 5:
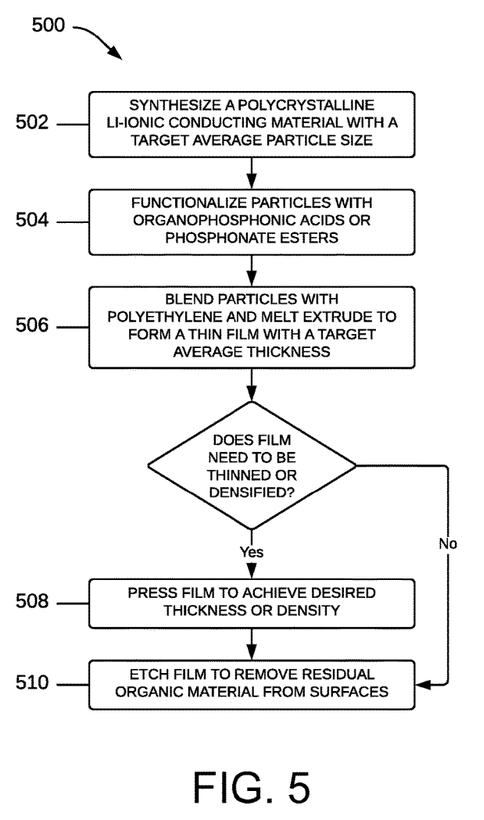
FIGS. 5-8 depict different processes to form variants of the composite electrolyte structure of FIG. 1.

FIGS. 5-8 depict different processes to form variants of the composite electrolyte structure 20 of FIG. 1. FIG. 5 illustrates a first process 500 to form a first variant of the ceramic-polymer composite electrolyte 20 of FIG. 1. Initially, a polycrystalline Li-ionic conducting material, such as lithium lanthanum titanium oxide ("LLTO"), is synthesized with an average particle size of 6 microns (block 502). These particles are then functionalized with organophosphonic acids or phosphonate esters such as 1-decylphosphonic acid or diethyl undec-10-enyl phosphonate, for example, as per Ruiterkamp, G. J. et al, "Surface functionalization of titanium dioxide nanoparticles with alkanephosphonic acids for transparent nanocomposites", *Journal of Nanoparticle Research*, 13 (2011) 2779 (block 504). The functionalized particles are then blended with polyethylene, either pure or containing small amounts of initiators, and melt extruded to form a thin film with average thickness of 20 microns (block 506). In some instances, pressing is required to thin or densify the film (block 508). The film is then briefly etched, for example with oxygen plasma or UV-ozone, to remove residual organic material from the surfaces of the LLTO (block 510).

Figure 6:
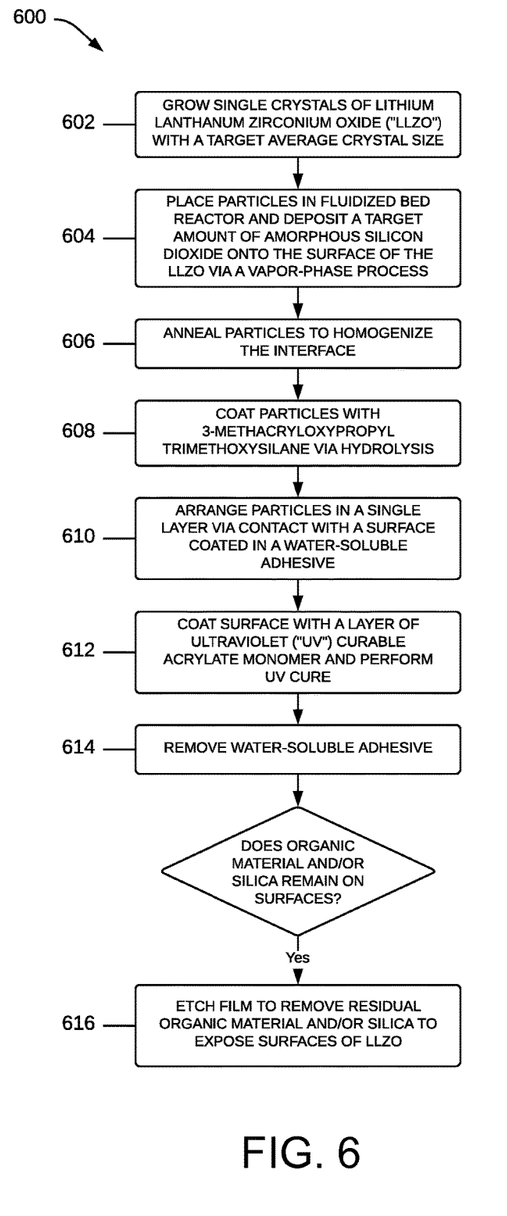

FIG. 6 illustrates a second process 600 to form a second variant of the ceramic-polymer electrolyte 20 of FIG. 1. In the second process 600, single crystals of lithium lanthanum zirconium oxide ("LLZO") are grown with an average crystal size of 20 microns (block 602). These particles are placed in a fluidized bed reactor and 100 nm of amorphous silicon dioxide ("$SiO_2$") is deposited by a vapor-phase process, such as sputtering, onto the surface of the LLZO (block 604). After deposition, the particles are briefly annealed to homogenize the interface (block 606). The particles are then coated with 3-methacryloxypropyl trimethoxysilane via hydrolysis (block 608). The coated particles are then arranged in a single layer via contact with a surface coated in a water-soluble adhesive (block 610). The surface is then coated with a layer of ultraviolet (UV)-curable acrylate monomer and the entire assembly is UV cured (block 612). The water soluble adhesive is then removed (block 614). In some instances, the remaining film is briefly etched, for example with reactive-ion etching (RIE) or hydrogen fluoride (HF) etching combined with oxygen plasma or UV-ozone, to remove residual organic material and silica, thereby exposing the surfaces of the LLZO (block 616).

Figure 7:
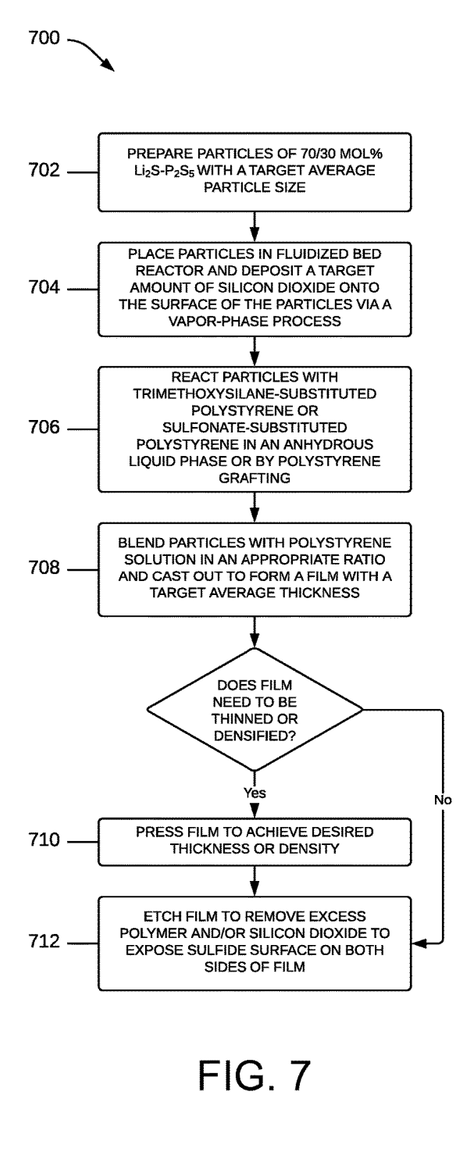

FIG. 7 illustrates a third process 700 to form a third variant of the ceramic-polymer electrolyte 20 of FIG. 1. In the third process 700, particles of amorphous 70/30 mol % $Li_2S$—$P_2S_5$ are prepared with an average particle size of 10 microns (block 702). These particles are placed in a fluidized bed reactor and 200 nm of $SiO_2$ is deposited by a vapor-phase process, such as sputtering, onto the surface of the $Li_2S$—$P_2S_5$ (block 704). The particles are then reacted with a trimethoxysilane-substituted polystyrene or sulfonate-substituted polystyrene in an anhydrous liquid phase or by polystyrene grafting (block 706). The reacted particles are then blended in an appropriate ratio with a polystyrene solution and cast out to form a film with an average thickness of 20 microns (block 708). In some instances, pressing is required to thin or densify the film (block 710). The film is then etched lightly, for example by RIE, to remove excess polymer and $SiO_2$, thereby exposing the sulfide surface on both sides of the thin film (block 712).

Figure 8:
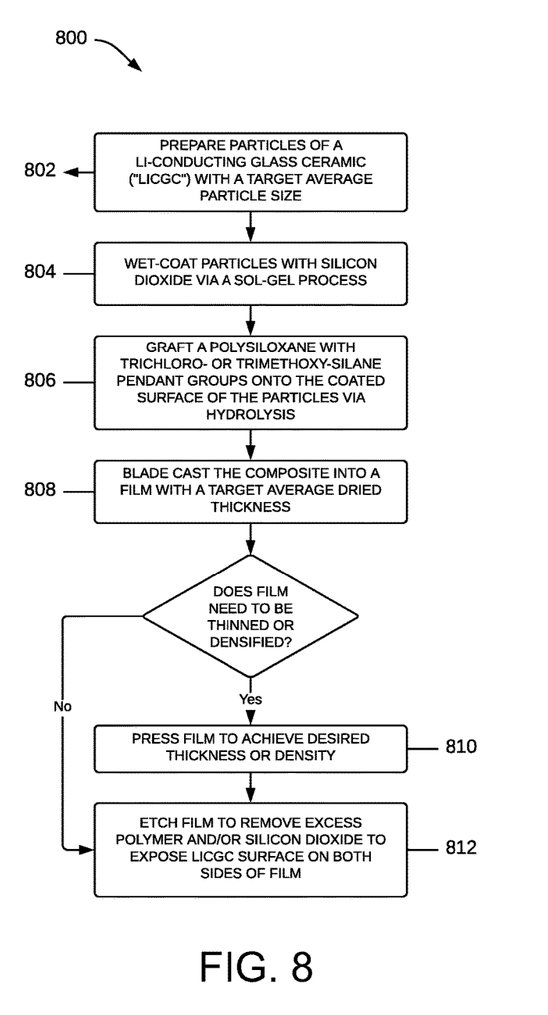

FIG. 8 illustrates a fourth process 800 to form a fourth variant of the ceramic-polymer electrolyte 20 of FIG. 1. In the fourth process 800, particles of lithium aluminum titanium silicon phosphate ("LATSP"), a Li-conducting glass ceramic ("LICGC"), are prepared with an average particle size of 12 microns (block 802). These particles are wet-coated with $SiO_2$ via a typical sol-gel process (block 804). A polysiloxane with trichloro- or trimethoxy-silane pendant groups is grafted onto the $SiO_2$ coated surface of the particles via hydrolysis (block 806). The composite is then blade cast into a film with an average dried thickness of 12 microns (block 808). In some instances, pressing is required to thin or densify the film (block 810). The film is then etched lightly, for example by RIE, to remove excess polymer and $SiO_2$, thereby exposing the LATSP surface on both sides of the thin film (block 812).

The composite electrolyte disclosed herein as well as batteries and devices which include the composite electrolyte can be embodied in a number of different types and configurations. The following embodiments are provided as examples and are not intended to be limiting.

Embodiment 1

A composite electrolyte contains at least one ion-conducting inorganic phase and at least one non-conducting organic phase. The primary inorganic ion-conducting phase is composed of particles or structures that traverse the entire thickness of the electrolyte, and the interfaces between different materials in the composite membrane possess strong adhesion characteristics.

Embodiment 2

The composite electrolyte forms a membrane that possesses an average ionic conductivity of at least 1E-5 S/cm, or area-specific resistance below 50 ohm-cm2 (preferably <10 ohm-cm2).

Embodiment 3

The strong adhesion at the interfaces between the different materials in the composite electrolyte is achieved via use of an unbroken chain of ionic or covalent bonds.

Embodiment 4

The strong adhesion at the interfaces between the different materials in the composite electrolyte is achieved via adhesion promoters or other surface modification agents.

Embodiment 5

The composite electrolyte is stable against, or forms a stable solid electrolyte interface (SEI) against, Li metal.

Embodiment 6

The composite electrolyte forms a free-standing, flexible film.

Embodiment 7

The composite electrolyte prevents or hinders passage of solvents or salts.

Embodiment 8

The composite electrolyte has a transference number t+ of greater than 0.8.

Embodiment 9

The composite electrolyte is resistant to Li dendrite penetration at current densities of at least 0.1 mA/cm2.

Embodiment 10

A battery contains a composite electrolyte with at least one ion-conducting inorganic phase and at least one non-conducting organic phase. The primary inorganic ion-conducting phase is composed of particles or structures that traverse the entire thickness of the electrolyte, and the interfaces between different materials in the composite membrane possess strong adhesion characteristics.

Embodiment 11

The composite electrolyte functions to suppress lithium dendrites.

Embodiment 12

The composite electrolyte functions to isolate otherwise solvents, salts, or other mobile materials on one or more of the anode side and the cathode side of the cell.

Embodiment 13

The composite electrolyte functions to modulate salt concentration gradients in liquid, gel, or polymeric batteries, thereby enabling improved rate capability.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A battery cell, comprising:
   a positive electrode;
   a negative electrode; and
   at least one thin-film composite electrolyte structure disposed between the positive electrode and the negative electrode, the electrolyte structure including:
   a first side and a second side defining a thickness,
   a non-conducting organic phase portion extending from the first side to the second side, and
   a plurality of ion-conducting inorganic phase structures dispersed throughout the non-conducting organic phase portion, each of the plurality of ion-conducting inorganic phase structures spanning the thickness such that a first portion of each of the plurality of ion-conducting inorganic phase structures is exposed on the first side and a second portion of each of the plurality of ion-conducting inorganic phase structures is exposed on the second side, each of the plurality of ion-conducting inorganic phase structures defining a respective interface with the non-conducting organic phase portion, wherein
   each of the respective interfaces includes an unbroken chain of at least one of ionic bonds and covalent bonds so as to firmly adhere the non-conducting organic phase portion to each of the plurality of ion-conducting inorganic phase structures,
   each of the plurality of ion-conducting inorganic phase structures is formed from a glass ceramic material,
   each structure of the plurality of ion-conducting inorganic phase structures include a first layer of a first adhesion promoter disposed on a surface of the structure and a second adhesion promoter grafted on the first layer,
   the glass ceramic material is lithium aluminum titanium silicon phosphate,
   the first adhesion promoter is silicon dioxide, and
   the second adhesion promoter is a polysiloxane with one of trichloro-silane pendant groups or trimethoxy-silane pendant groups.

2. The battery cell of claim 1, further comprising a separator disposed between the positive electrode and the negative electrode, the at least one thin-film composite electrolyte structure disposed between the separator and the negative electrode.

3. The battery cell of claim 2, wherein the negative electrode is formed from lithium metal, and wherein the at least one thin-film composite electrolyte structure is configured to resist dendrite penetration at current densities of at least 0.1 mA/cm$^2$.

4. The battery cell of claim 1, further comprising a separator disposed between the positive electrode and the negative electrode, the at least one thin-film composite electrolyte structure disposed between the separator and the positive electrode.

5. The battery cell of claim 1, further comprising one of a liquid electrolyte, a gel electrolyte, and a polymer electrolyte, wherein the at least one thin-film composite electrolyte structure is configured to modulate salt concentration gradients in the one of the liquid electrolyte, the gel electrolyte, and the polymer electrolyte.

6. The battery cell of claim 1, wherein the battery cell is a two-compartment battery cell with anolyte in a first compartment and catholyte in a second compartment, the at least one thin-film composite electrolyte structure configured to separate the anolyte and the catholyte from one another.

7. The battery cell of claim 1, wherein the at least one thin-film composite electrolyte structure forms a free-standing, flexible film with a transference number greater than 0.8.

8. The battery cell of claim 1, wherein the at least one thin-film composite electrolyte structure has an average ionic conductivity of at least 1E-5 S/cm.

9. A composite electrolyte structure, comprising:
   a first side and a second side defining a thickness;
   a non-conducting organic phase portion extending from the first side to the second side; and
   a plurality of ion-conducting inorganic phase structures dispersed throughout the non-conducting organic phase portion, each of the plurality of ion-conducting inorganic phase structures spanning the thickness such that a first portion of each of the plurality of ion-conducting inorganic phase structures is exposed on the first side and a second portion of each of the plurality of ion-conducting inorganic phase structures is exposed on the second side, each of the plurality of ion-conducting inorganic phase structures defining a respective interface with the non-conducting organic phase portion, wherein
   each of the respective interfaces includes an unbroken chain of at least one of ionic bonds and covalent bonds so as to firmly adhere the non-conducting organic phase portion to each of the plurality of ion-conducting inorganic phase structures, each of the plurality of ion-conducting inorganic phase structures is formed from a monocrystalline material, the structures each including a first layer of a first adhesion promoter disposed on a surface of the structure and a second layer of a second adhesion promoter disposed on the first layer, the monocrystalline material is lithium lanthanum zirconium oxide, the first adhesion promoter is silicon dioxide, the second adhesion promoter is 3-methacryloxypropyl trimethoxysilane, and the non-conducting organic phase portion is ultraviolet-curable acrylate monomer.

10. The composite electrolyte structure of claim 9, wherein each of the respective interfaces includes an adhesion promoter configured to improve adhesion between the non-conducting organic phase portion and each of the plurality of ion-conducting inorganic phase structures.

11. The composite electrolyte structure of claim 9, wherein a third portion of each of the plurality of ion-conducting inorganic phase structures is unexposed between the first and second sides, the third portion modified by a surface modification agent so as to improve adhesion to the non-conducting organic phase portion.

12. The composite electrolyte structure of claim 9, wherein each of the plurality of ion-conducting inorganic phase structures has a predetermined average particle size, and the predetermined average particle size is one size of a range of sizes from 6 to 20 μm.

13. A composite electrolyte structure, comprising:
a first side and a second side defining a thickness;
a non-conducting organic phase portion extending from the first side to the second side; and
a plurality of ion-conducting inorganic phase structures dispersed throughout the non-conducting organic phase portion, each of the plurality of ion-conducting inorganic phase structures spanning the thickness such that a first portion of each of the plurality of ion-conducting inorganic phase structures is exposed on the first side and a second portion of each of the plurality of ion-conducting inorganic phase structures is exposed on the second side, each of the plurality of ion-conducting inorganic phase structures defining a respective interface with the non-conducting organic phase portion, wherein each of the respective interfaces includes an unbroken chain of at least one of ionic bonds and covalent bonds so as to firmly adhere the non-conducting organic phase portion to each of the plurality of ion-conducting inorganic phase structures, each of the plurality of ion-conducting inorganic phase structures is formed from an amorphous material, the structures each including a first layer of a first adhesion promoter disposed on a surface of the structure and a second adhesion promoter reacted with the first layer, the amorphous material is $Li_2S$—$P_2S_5$ in a ratio of 70/30 mol %, the first adhesion promoter is silicon dioxide, the second adhesion promoter is one of a trimethoxysilane-substituted polystyrene or a sulfonate-substituted polystyrene, and the non-conducting organic phase portion is polystyrene.

* * * * *